United States Patent
Wei et al.

(10) Patent No.: US 9,350,275 B2
(45) Date of Patent: May 24, 2016

(54) QUASI VARIABLE FREQUENCY MOTOR CONTROLLER

(71) Applicant: Rockwell Automation Technologies, Inc., Mayfield Heights, OH (US)

(72) Inventors: Kun Wei, Shanghai (CN); HaiHui Lu, Shanghai (CN); Andrew Jaap, Milwaukee, WI (US); David Messersmith, Kenosha, WI (US); Randall Langer, Oak Creek, WI (US); Ping Lee, Milwaukee, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 94 days.

(21) Appl. No.: 14/321,330

(22) Filed: Jul. 1, 2014

(65) Prior Publication Data
US 2015/0333663 A1  Nov. 19, 2015

(30) Foreign Application Priority Data
May 19, 2014  (CN) .......................... 2014 1 0211092

(51) Int. Cl.
*H02P 1/04* (2006.01)
*H02P 1/16* (2006.01)
*H02P 1/40* (2006.01)

(52) U.S. Cl.
CPC .. *H02P 1/04* (2013.01); *H02P 1/16* (2013.01); *H02P 1/40* (2013.01)

(58) Field of Classification Search
CPC ............. H02P 1/04; H02P 1/16; H02P 27/04; H02P 27/047; H02P 1/40
USPC .................................. 318/430, 255, 773, 807
See application file for complete search history.

(56) References Cited

U.S. PATENT DOCUMENTS

| 4,996,470 A | 2/1991 | Rowan et al. |
| 5,187,419 A | 2/1993 | DeLange |

(Continued)

FOREIGN PATENT DOCUMENTS

| CN | 1599230 | 3/2005 |
| CN | 1808881 | 7/2006 |

(Continued)

OTHER PUBLICATIONS

Ginart et al, Thyristor Controlled AC Induction Motors using a Discrete Frequency Control Method,1997, IEEE, pp. 164-167.*

(Continued)

*Primary Examiner* — Bentsu Ro
*Assistant Examiner* — Zemenay Truneh
(74) *Attorney, Agent, or Firm* — Kunzler Law Group

(57) ABSTRACT

An apparatus for a quasi variable frequency motor controller is includes a DFC module that applies a first frequency to a motor as part of a discrete frequency control ("DFC") method for motor starting. The first frequency includes a discrete frequency in a plurality of discrete frequencies of the DFC method and each discrete frequency includes a frequency lower than a fundamental frequency of an alternating current ("AC") voltage source providing power to the motor. The apparatus includes a torque module that determines when motor torque generated by the motor reaches a negative torque threshold and a next frequency module that applies a second frequency to the motor in response to the torque module determining that the motor torque has reached the negative torque threshold. The second frequency is a next frequency in the DFC method.

22 Claims, 13 Drawing Sheets

(56) References Cited

U.S. PATENT DOCUMENTS

| | | |
|---|---|---|
| 7,023,166 B1 | 4/2006 | Kohen et al. |
| 7,345,449 B2 | 3/2008 | Barie et al. |
| 8,040,086 B2 | 10/2011 | Yamamoto |
| 8,138,709 B2 | 3/2012 | Messersmith et al. |
| 8,179,082 B2 * | 5/2012 | Li .......................... H02P 1/40 318/430 |
| 8,203,304 B2 | 6/2012 | Lu et al. |

FOREIGN PATENT DOCUMENTS

| | | |
|---|---|---|
| CN | 1889354 A | 1/2007 |
| CN | 201550058 U | 8/2010 |
| CN | 202009354 U | 10/2011 |
| CN | 202172377 U | 3/2012 |
| CN | 103199768 A | 7/2013 |
| EP | 0408045 A1 | 1/1991 |
| EP | 2061144 A1 | 5/2009 |

OTHER PUBLICATIONS

Kaiqi et al, Discrete Variable Frequency Soft Starting on DSP-based Voltage Controller-Fed IM Drive, 2003, IEEE, pp. 758-763.*

Arrwen et al, Study of High Torque Softstarter Based on Discrete Frequency, Sep. 23, 2003, China Academic Journal Electronic Publishing House.*

* cited by examiner

QUASI VARIABLE FREQUENCY MOTOR CONTROLLER

CROSS-REFERENCE TO RELATED APPLICATIONS

This application claims priority to Chinese Patent Application Number 201410211092.8 entitled "QUASI VARIABLE FREQUENCY MOTOR CONTROLLER" and filed on May 19, 2014 for Kun Wei, et al. the entire contents of which are incorporated herein by reference for all purposes. See MPEP §201.14.

FIELD

The subject matter disclosed herein relates to motor control and more particularly relates to motor control during startup using a quasi variable frequency motor controller.

BACKGROUND INFORMATION

Alternating current ("AC") motors often have a high startup current, especially certain design types such as National Electrical Manufacturers Association ("NEMA") design B motors, which are popular. Often motor starters are used that include a mechanism to start motors while keeping starting current low. A wide variety of motor starters are available, including traditional motor starters that use a reduced voltage to start motors. However, many motor starters are inefficient. Variable frequency drives ("VFDs") may also be used to start a motor. While variable frequency drives are common, thyristor-based starters have certain advantages as well. For example, thyristor-based starters may be more economical for larger motors and may be smaller. VFDs may be used for motor speed control, but certain applications may not need variable speed after startup and therefore a lower cost starter may be desirable. Thyristors are often sized to handle a certain amount of current, so reduction of current during startup is desirable. A control method for motor startup using thyristors that minimizes thyristor size is desirable.

BRIEF DESCRIPTION

An apparatus for a quasi variable frequency motor controller is disclosed. A system and method also perform the functions of the apparatus. The apparatus includes a DFC module that applies a first frequency to a motor as part of a discrete frequency control ("DFC") method for motor starting. The first frequency includes a discrete frequency in a plurality of discrete frequencies of the DFC method and each discrete frequency includes a frequency lower than a fundamental frequency of an alternating current ("AC") voltage source providing power to the motor. The apparatus includes a torque module that determines when motor torque generated by the motor reaches a negative torque threshold and a next frequency module that applies a second frequency to the motor in response to the torque module determining that the motor torque has reached the negative torque threshold. The second frequency is a next frequency in the DFC method.

In one embodiment, the apparatus includes a switch module that selectively connects each input power conductor to the motor in a sequence. The DFC module connects the power conductors to the motor based on a discrete frequency of the plurality of discrete frequencies. In another embodiment, the switch module includes one or more thyristors and each thyristor is controlled using the DFC method by adjusting a phase angle for turning on each thyristor. In another embodiment, the apparatus includes a step start module that executes one or more starting steps, where each starting step is initiated after the next frequency module advances the discrete frequency to a last discrete frequency of the DFC method. Each step includes setting, for a fixed period of time, an on time of a switch of the switching module to a fixed value and/or ramping an on time of a switch of the switching module. In another embodiment, the apparatus includes a contactor module that applies full input voltage to the motor after a last step of the step start module and/or a last discrete frequency of the DFC module. The contactor module applies the full input voltage by closing a contactor in parallel with each thyristor.

In one embodiment, the DFC module applies a discrete frequency by varying a phase angle for turning on a thyristor to generate positive current pulses of varying amplitudes for a positive half cycle of the discrete frequency and then varying a phase angle for turning on a thyristor to generate negative current pulses of varying amplitudes for a negative half cycle of the discrete frequency. Each current pulse is generated at a rate consistent with the fundamental frequency of the AC voltage source. In another embodiment, the torque module determines motor torque by calculating motor torque from input voltage and current information. The input voltage and current information are from conductors connected to the motor to provide power to the motor.

In one embodiment, the torque module determines motor torque using the following equation:

$$T_{est} = \frac{3}{2} P \left[ I_\beta \cdot \int (V_\alpha - I_\alpha R_s) dt - I_\alpha \cdot \int (V_\beta - I_\beta R_s) dt \right]$$

where:
$T_{est}$ is calculated motor torque;
P is the number of motor poles;
$R_s$ is resistance of stator winding;
$V_\alpha$, $V_\beta$ are stator voltage in a stationary reference frame; and
$I_\alpha$, $I_\beta$ are stator current in the stationary reference frame, where the voltage and current for each phase of the motor are transformed to the stationary reference frame using an alpha-beta transformation.

In one embodiment, the torque module determines motor torque by measuring motor torque. In another embodiment, the torque module determines motor torque based on current and voltage sampled at a frequency lower than the fundamental frequency of the AC voltage source. In another embodiment, the torque module determines motor torque based on a phase of input power in relation to a phase of rotor current. In another embodiment, the next frequency module applies a next frequency of the DFC method each time the torque module determines that the motor torque reaches the negative current threshold until reaching a final frequency of the DFC method. In another embodiment, a last discrete frequency in the DFC method includes a frequency that is between 25 percent and 50 percent of the fundamental frequency of the AC voltage source. In another embodiment, the motor is a three-phase AC squirrel cage motor or a three-phase AC synchronous motor.

A method for a quasi variable frequency motor controller includes applying a first frequency to a motor as part of a DFC method for motor starting. The first frequency includes a discrete frequency in a plurality of discrete frequencies of the DFC method and each discrete frequency is a frequency lower than a fundamental frequency of an AC voltage source providing power to the motor. The method includes determining when motor torque generated by the motor reaches a negative torque threshold, and applying a second frequency to the motor in response to determining that the motor torque reaches the negative torque threshold. The second frequency is a next frequency in the DFC method.

In one embodiment, determining motor torque includes calculating motor torque from input voltage and current information. The input voltage and current information are from conductors connected to the motor to provide power to the motor. In another embodiment, determining motor torque includes using the following equation:

$$T_{est} = \frac{3}{2}P\left[I_\beta \cdot \int (V_\alpha - I_\alpha R_s)dt - I_\alpha \cdot \int (V_\beta - I_\beta R_s)dt\right]$$

where:
$T_{est}$ is calculated motor torque;
P is the number of motor poles;
$R_s$ is resistance of stator winding;
$V_\alpha$, $V_\beta$ are stator voltage in a stationary reference frame; and
$I_\alpha$, $I_\beta$ are stator current in the stationary reference frame, where the voltage and current for each phase of the motor are transformed to the stationary reference frame using an alpha-beta transformation.

In one embodiment, the method includes applying a next frequency of the DFC method each time that the motor torque reaches the negative torque threshold until reaching a final frequency of the DFC method. In another embodiment, the method includes selectively connecting each input power conductor to the motor in a sequence, where the DFC method includes connecting the power conductors to the motor based on a discrete frequency of the plurality of discrete frequencies. In a further embodiment, selectively connecting each input power conductor to the motor in a sequence includes switching one or more thyristors and each thyristor is controlled using the DFC method by adjusting a phase angle for turning on each thyristor.

In one embodiment, the method includes executing one or more starting steps where each starting step is initiated after advancing the discrete frequency to a last discrete frequency of the DFC method. Each step includes setting, for a fixed period of time, an on time of a switch to a fixed value, the switch connecting the AC voltage source to the motor and/or ramping an on time of a switch connecting the AC voltage source to the motor. In another embodiment, the method includes applying full input voltage to the motor after a last starting step, where applying the full input voltage includes closing a contactor in parallel with each thyristor. In another embodiment, applying a discrete frequency includes varying a phase angle for turning on a thyristor to generate positive current pulses of varying amplitudes for a positive half cycle of the discrete frequency and then varying a phase angle for turning on a thyristor to generate negative current pulses of varying amplitudes for a negative half cycle of the discrete frequency, where each current pulse is generated at a rate consistent with the fundamental frequency of the AC voltage source.

A system for a quasi variable frequency motor controller includes a motor starter. The motor starter includes one or more thyristors connected between each phase of an input power source and a corresponding motor connector. The system includes a DFC module that applies a first frequency to the motor as part of a DFC method for motor starting. The first frequency is a discrete frequency in a plurality of discrete frequencies of the DFC method and each discrete frequency is a frequency lower than a fundamental frequency of an AC voltage source providing power to the motor. The system includes a switch module that selectively turns on, based on a selected discrete frequency of the DFC module, each thyristor to connect each phase of the input power source to the corresponding motor connector in a sequence. The system includes a torque module that determines when motor torque generated by the motor reaches a negative torque threshold, and a next frequency module that applies a second frequency to the motor in response to the torque module determining that the motor torque reaches the negative torque threshold. The second frequency is a next frequency in the DFC method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
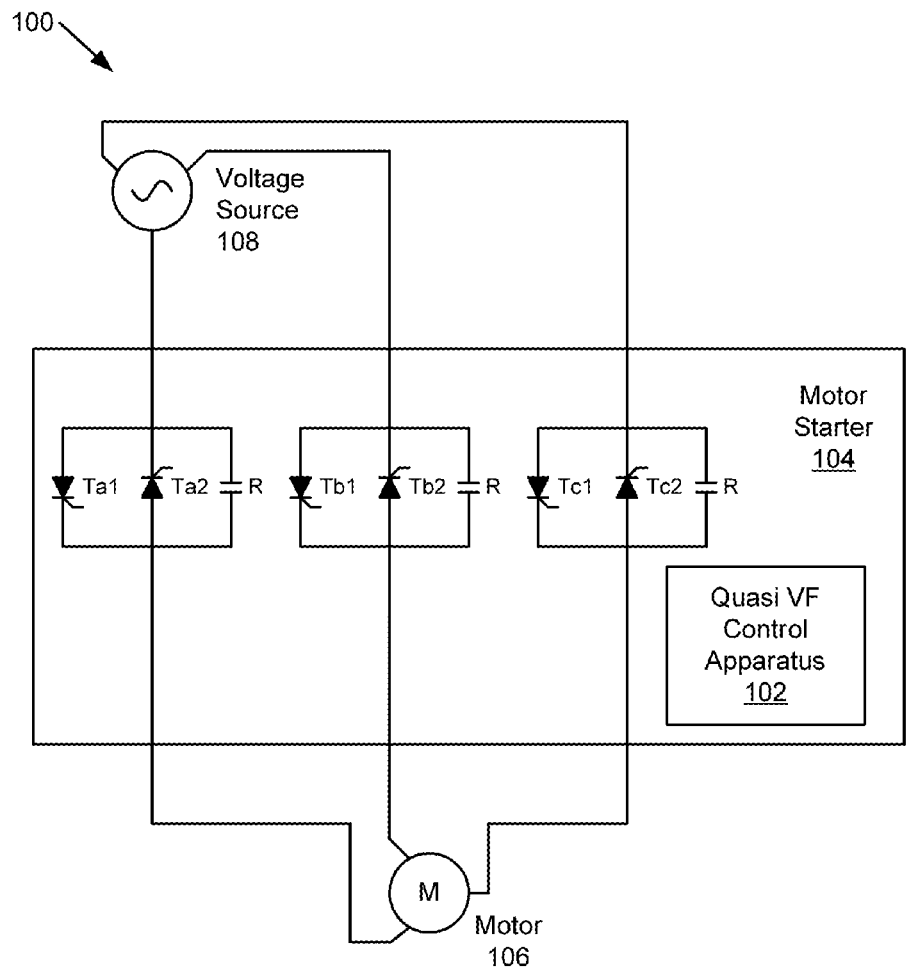
FIG. 1 is a schematic block diagram illustrating one embodiment of a system for a quasi variable frequency motor controller.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 is a schematic block diagram illustrating one embodiment of a system 100 for a quasi variable frequency motor controller. The system 100 includes a quasi variable frequency control apparatus 102 in a motor starter 104 with thyristors Ta1, Ta2, Tb1 Tb2, Tc1, Tc2 (collectively "T") and contactors R, a motor 106, and a voltage source 108, which are described below.

The system 100 includes a quasi variable frequency control apparatus 102 in the motor starter 104. The quasi variable frequency control apparatus 102 generates frequencies lower than a fundamental frequency of the voltage source 108 and also minimizes negative torque pulses during a motor startup operation. The quasi variable frequency control apparatus 102 is discussed in more detail with regard to the apparatuses 200, 400, 500 of FIGS. 2, 4 and 5.

In one embodiment, the system 100 includes a motor starter 104 connected between a voltage source 108 and a motor 106. In one embodiment, the motor starter 104 includes thyristors T for each phase of the voltage source 108. A thyristor, also known as a silicon controlled rectifier ("SCR"), is a solid state device that blocks current through an anode and a cathode until voltage is applied between a gate and the cathode. Typically, when the voltage is applied between the gate and cathode, a thyristor conducts until voltage from the anode to cathode is negative and the thyristor is reverse biased. In one embodiment, the motor starter 104 includes back-to-back thyristors (e.g. Ta1, Ta2) to accommodate negative voltages for alternating current ("AC") waveforms. The motor starter 104 includes back-to-back thyristors (e.g. Ta1, Ta2 and Tb1 Tb2 and Tc1, Tc2) for each phase of the voltage source 108.

In one embodiment, the thyristors T are used for motor starting and the motor starter 104 includes a contactor R in parallel with each pair of thyristors (e.g. Ta1, Ta2). The contactors R, in one example, are closed with a single coil. In another example, each contactor R is controlled separately with separate coils. Typically, when startup for the motor 106 is complete, the contactors R are closed to apply full voltage to the motor 106. In another embodiment, the motor starter 104 does not include contactors R and the thyristors T operate after startup. In various embodiments, the motor starter 104 includes other types of switches, such as a TRIAC (triode for alternating current), an insulated-gate bipolar transistor ("IGBT"), a field effect transistor ("FET"), etc. Typically the switches are capable of operating during a portion of a cycle of the fundamental frequency of the voltage source 108 to connect the voltage source 108 to the motor 108 during a portion of a cycle.

The motor starter 104 may also include other components and systems typical of a motor starter 104, such as relays, contactors, sensors, overcurrent protection such as fuses, motor overloads, a communications bus, controls, a processor, memory, etc. The motor starter 104 may be a stand-alone enclosure or may be in a motor control center ("MCC"). The motor starter 104 may be rated for a single motor 106 or may be rated to control multiple motors. One of skill in the art will recognize other components and systems that may be included in the motor starter 104.

The system 100 includes a motor 106 connected to the motor starter 104. The motor 106, in one embodiment, is a three-phase motor that receives AC power. For example, the motor 106 may be a three-phase AC squirrel-cage motor. In another example, the motor 106 is a three-phase AC synchronous motor. In another embodiment, the motor 106 receives power from a voltage source 108 with a different number of phases. For example, the motor 106 may be a single-phase motor and the voltage source 108 may be a single-phase voltage source. For example, where the motor 106 is single phase, the motor 106 may include a separate starting winding, such as shaded pole winding, a winding connected with a centrifugal switch, etc. The motor 106 may be any motor that is capable of being controlled by altering on time of switches feeding the motor 106.

The system 100, in one embodiment, includes a voltage source 108 that provides power to the motor 106 through the motor starter 104, and may also be called an input power source. In one embodiment, the voltage source 108 is derived from an electric utility and may include a portion of a power distribution system with electrical panels, switchgear, circuit breakers, fuses, etc. In another embodiment, the voltage source 108 includes a generator, an inverter, or other power source capable of providing AC power to the motor 106. In the embodiment, depicted in FIG. 1, the voltage source 108 is a three-phase AC source. In another embodiment, the voltage source 108 is a direct current ("DC") source, such as a battery, and the system includes an inverter to invert the DC voltage from the DC source to an AC voltage for providing power to the motor 106. In other embodiments, the voltage source 108 may be a fuel cell, a wind turbine or other alternate energy source. One of skill in the art will recognize other ways to implement the voltage source 108.

Figure 2:
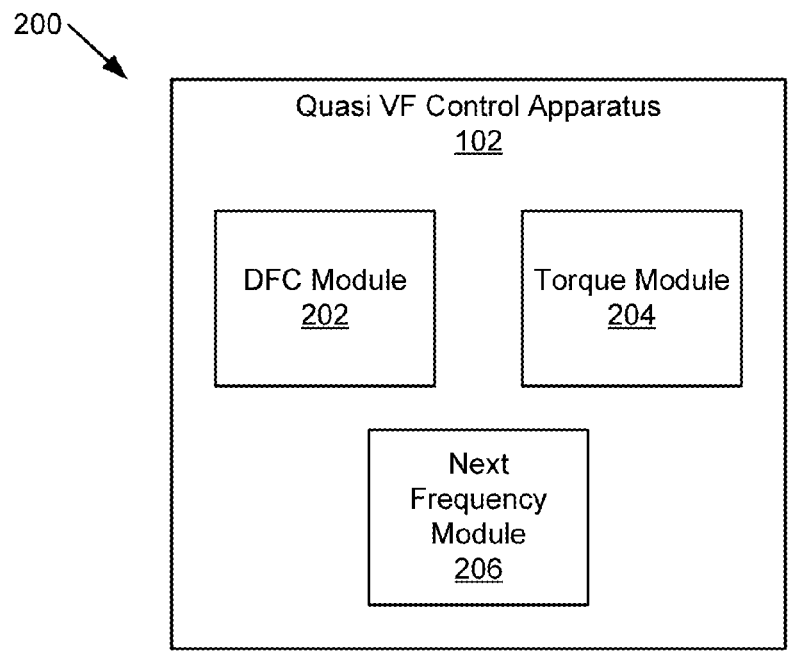
FIG. 2 is a schematic block diagram illustrating one embodiment of an apparatus for a quasi variable frequency motor controller.

FIG. 2 is a schematic block diagram illustrating one embodiment of an apparatus 200 for a quasi variable frequency motor controller. The apparatus 200 includes one embodiment of the quasi variable frequency control apparatus 102 with a DFC module 202, a torque module 204, and a next frequency module 206, which are described below.

The apparatus 200, in one embodiment, includes a DFC module 202 that applies a first frequency to the motor 106 as part of a discrete frequency control ("DFC") method for motor starting. The first frequency is a discrete frequency in a plurality of discrete frequencies of the DFC method. The DFC module 202 may apply a number of discrete frequencies to the motor, each in sequence. In one embodiment, the DFC method applies power to the motor 106 for a portion of a cycle of the AC voltage source 108 and varies the amount of power applied and polarity of the power so that over several cycles, the DFC method generates a series of waveforms that have a fundamental sinusoidal waveform at a frequency lower than the fundamental waveform of the AC voltage source. In the DFC method, each discrete frequency includes a frequency lower than the fundamental frequency of the AC voltage source 108 providing power to the motor 106.

Figure 3:
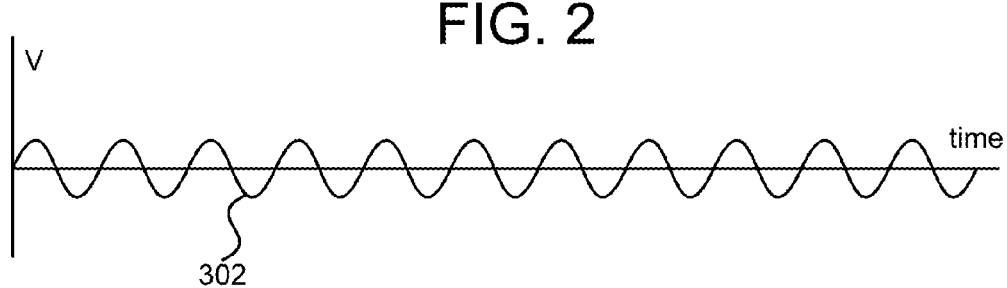
FIG. 3 is an illustration of waveforms for possible operation of a quasi variable frequency motor controller using a discrete frequency control method.
Figure 3:
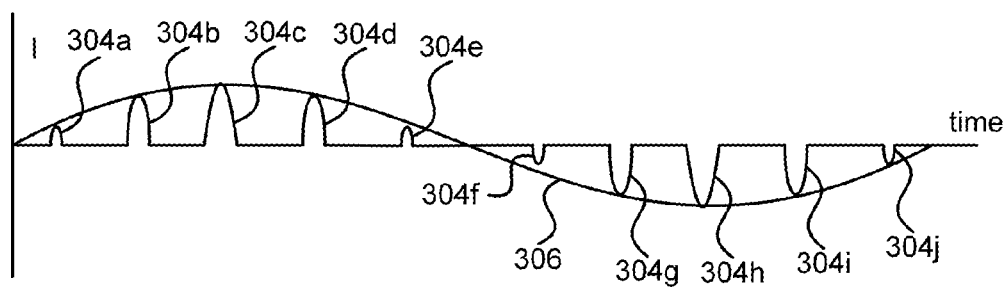

FIG. 3 is an illustration of waveforms for possible operation of a quasi variable frequency motor controller using a discrete frequency control ("DFC") method. The upper waveform includes a sinusoidal voltage waveform 302 with voltage V on the vertical or Y-axis and time on the horizontal or X-axis. The voltage waveform 302 may be a 50 Hz or 60 Hz sinusoidal voltage waveform, for example. In other embodiments, a different fundamental frequency may be used. The lower waveform includes time on the horizontal and current I on the vertical or Y-axis.

The lower waveform includes several current pulses 304a-j of varying amplitudes and polarity. In the depicted waveform, a first pulse 304a is positive and small relative to other pulses (e.g. 304b-d). The second pulse 304b is larger than the first pulse 304a and the third pulse 304c is larger than the first and second pulses 304a, 304b. The fourth pulse 304d is smaller than the third pulse 304c and may have the same amplitude as the second pulse 304b. The fifth pulse 304e is smaller than the fourth pulse 304d and may have the same amplitude as the first pulse 304a. A series of negative pulses 304f-j follows the positive pulses 304a-e and may mirror the pattern of the positive pulses 304a-e, except that the negative pulses 304f-j have an amplitude that is negative.

Note that each pulse 304a-j occurs relative to zero crossing of the voltage waveform 302. Due to the size and polarity of the pulses 304a-j, a waveform is generated that has a fundamental frequency lower than the fundamental frequency of the voltage waveform 302. The lower fundamental frequency is depicted as waveform 306. One of skill in the art will recognize that a Fourier Transform of the waveform formed by the pulses 304a-j will include a fundamental frequency and harmonic frequencies. The amplitude, location, and polarity of the current pulses 304a-j are chosen so that a fundamental frequency 306 is generated as shown having a frequency lower than the frequency of the voltage waveform 302.

While the lower waveform in FIG. 3 includes five positive pulses 304a-e and five negative pulses 304f-j, other frequencies may also be generated by having more or less pulses per cycle and by adjusting amplitudes of the pulses. Note that a single voltage waveform 302 and corresponding current pulses 304a-j are shown in FIG. 3, but one of skill in the art will recognize that additional waveforms are included for three-phase systems. The DFC method may include phase shifting as appropriate so that if a fundamental waveform 306 of a lower frequency is generated, a second and a third corresponding lower frequency waveforms are also generated but phase shifted as appropriate for three-phase motor operation. For example, a second waveform may be phase shifted one-third of a cycle of the fundamental waveform 306 and a third waveform may be phase shifted two-thirds of a cycle of the fundamental waveform 306. For each discrete frequency of the DFC method, phase shifting of a second phase and a third phase are typically customized for the specific discrete frequency.

With the motor starter 104 as depicted in the system 100 of FIG. 1, one method of generating the pulses 304*a-j* is to trigger the appropriate thyristor (e.g. Ta1) at a specific time. If thyristor Ta1 is not triggered during a cycle, then the thyristor Ta1 will typically not conduct (other than leakage current). If thyristor Ta1 is triggered during a positive half cycle, typically current will start to flow to the motor 106. Current will usually continue to flow until the thyristor Ta1 is reversed biased. Note that current may continue to flow in the thyristor Ta1 for a period of time after being reverse biased due to inductance in the conductors and motor 106, but typically will eventually stop.

Based on voltage, motor impedance, parasitic resistance and inductance of the conductors, desired amplitude, etc., a trigger point within a cycle for a specific current pulse 304 may be chosen to generate a current pulse 304 of a specific amplitude. For example, a trigger point nearer to a zero crossing of the voltage waveform 302 will result in a pulse that is smaller than a pulse where the trigger point is earlier and farther from the zero crossing. For a negative current pulse, a thyristor (e.g. Ta2) may be chosen that is situated to conduct on a negative half cycle of the voltage waveform 302.

Where the DFC module 202 applies a discrete frequency that is less than the frequency of the fundamental of the voltage source 108, the motor 106 will have a rotating magnetic field applied to the stator of the motor 106 that will generate a mechanical force within the motor 106 to start turning the motor 106 in a particular direction, which causes a shaft connected to the rotor to generate a certain amount of torque. As the rotor of the motor 106 increases in speed, momentum of the motor may cause the rotor to increase in speed such than a negative torque pulse is generated. The negative torque pulse may have undesirable effects, such as decreased efficiency, increased heating, undesirable mechanical forces, noise, etc. In one embodiment, the motor 106 generates positive and negative torque pulses in an oscillating manner for at least a period of time, which is undesirable.

The apparatus 200, in one embodiment, includes a torque module 204 that determines when motor torque generated by the motor 106 reaches a negative torque threshold. Typically the negative torque threshold is set based on motor size, voltage, mechanical load, and the like. In one embodiment, the negative torque threshold is set to a negative value of motor torque. In another embodiment, the negative torque threshold is set to zero so that if motor torque transitions through zero to a negative value, the torque module 204 determines that the torque is negative. In one embodiment, the torque module 204 may include multiple negative torque thresholds where each threshold corresponds to a different condition, such different loading conditions, different discrete frequencies, etc.

In one embodiment, the torque module 204 determines motor torque by calculating motor torque from input voltage and current information. The input voltage and current information are from conductors connected to the motor 106 to provide power to the motor 106. In one embodiment, motor torque can be determined using equation 1:

$$T_{est} = \frac{3}{2} P \left[ I_\beta \cdot \int (V_\alpha - I_\alpha R_s) dt - I_\alpha \cdot \int (V_\beta - I_\beta R_s) dt \right] \quad \text{(equation 1)}$$

where:

$T_{est}$ is calculated motor torque;

P is the number of motor poles;

$R_s$ is resistance of stator winding;

$V_\alpha$, $V_\beta$ are stator voltage in a stationary reference frame; and $I_\alpha$, $I_\beta$ are stator current in the stationary reference frame, where the voltage and current for each phase of the motor is transformed to the stationary reference frame using an alpha-beta transformation.

The alpha-beta transformation or $\alpha\beta 0$ transformation, which may also be known as a Clarke transformation, is a method used in electrical engineering to simplify three-phase circuit calculations. The alpha-beta transformation is a way to change voltage and current in a three-phase coordinate system to a two-phase reference frame. If voltage phasors Va, Vb, and Vc are 120 degrees apart, Cartesian axes may be superimposed on the three-phased coordinate system where $V\alpha$ is along the horizontal axis and $V\beta$ is along the vertical axis. Three-phase voltages varying in time along the axes a, b, and c can be algebraically transformed into two-phase voltages varying in time along the $\alpha$ and $\beta$ axes. The following is the alpha-beta transformation matrix:

$$T_{\alpha\beta 0} = \begin{bmatrix} \frac{2}{3} & -\frac{1}{3} & -\frac{1}{3} \\ 0 & \frac{1}{\sqrt{3}} & -\frac{1}{\sqrt{3}} \\ \frac{1}{3} & \frac{1}{3} & \frac{1}{3} \end{bmatrix} \quad \text{(equation 2)}$$

A set of three-phase, balanced voltages may be represented as $$\begin{bmatrix} V_a \\ V_b \\ V_c \end{bmatrix} = \begin{bmatrix} V_m \sin(\omega t) \\ V_m \sin\left(\omega t + \frac{2\pi}{3}\right) \\ V_m \sin\left(\omega t - \frac{2\pi}{3}\right) \end{bmatrix} \quad \text{(equation 3)}$$

in the three-phase coordinate system, where $V_m$ is a peak voltage, $\omega = 2\pi f$, and f is frequency in hertz. Applying the alpha-beta transformation to get two-phase voltages results in the following:

$$\begin{bmatrix} V_\alpha \\ V_\beta \\ V_0 \end{bmatrix} = T_{\alpha\beta 0} \begin{bmatrix} V_a \\ V_b \\ V_c \end{bmatrix} = \begin{bmatrix} V_m \sin(\omega t) \\ V_m \cos(\omega t) \\ 0 \end{bmatrix} \quad \text{(equation 4)}$$

Similarly, a set of balanced three-phase currents, which lag the voltage by an arbitrary angle $\delta$, may be converted to two-phase currents:

$$\begin{bmatrix} I_a \\ I_b \\ I_c \end{bmatrix} = \begin{bmatrix} I_m \sin(\omega t - \delta) \\ I_m \sin\left(\omega t - \delta + \frac{2\pi}{3}\right) \\ I_m \sin\left(\omega t - \delta - \frac{2\pi}{3}\right) \end{bmatrix} \quad \text{(equation 5)}$$

where $I_m$ is a peak current, $\omega=2\pi f$, and f is frequency in hertz. Applying the alpha-beta transformation to the get two-phase currents results in the following:

$$\begin{bmatrix} I_\alpha \\ I_\beta \\ I_0 \end{bmatrix} = T_{\alpha\beta 0} \begin{bmatrix} I_a \\ I_b \\ I_c \end{bmatrix} = \begin{bmatrix} I_m \sin(\omega t - \delta) \\ I_m \cos(\omega t - \delta) \\ 0 \end{bmatrix} \quad \text{(equation 6)}$$

In one embodiment, where voltage, current, and phase are measured and frequency is known, equation 1 may be used to calculate torque of the motor 106. In one embodiment, the torque module 204 calculates torque from current and voltage measurements sampled at a sampling rate less than a period of a frequency of the voltage source 108 or a voltage applied to the motor 106. In one embodiment, the sampling rate is much less than the period of the frequency of the voltage source 108. The torque module 204 may use equation 1 or may use another equation that calculates motor torque. The torque module 204 may determine when the calculated torque is less than the negative torque threshold. In another embodiment, the torque module 204 measures torque from one or more sensor and determines when the measured torque is less than the negative torque threshold.

In one embodiment, the torque module 204 determines motor torque based on a phase of input power in relation to a phase of rotor current. For example, the torque module 204 may determine a phase of the back-EMF (electro-motive force) of the rotor and a phase of the voltage source 108 and may compare the phase of the back-EMF to the phase of the voltage source 108 to determine if the torque is predicted to be negative or to exceed the negative torque threshold. For example, the phase of the back-EMF of the rotor may be determined by converting the three-phase power to the motor to two-phase coordinates using the alpha-beta transformation described above. In one embodiment, the phase of the back-EMF may be calculated using equation 7:

$$\theta_{flux} = \tan^{-1}\left(\frac{\int (V_\beta - I_\beta R_s)dt}{\int (V_\alpha - I_\alpha R_s)dt}\right) + 90° \quad \text{(equation 7)}$$

The supply voltage phase, in one embodiment, may be calculated using equation 8:

$$\theta_{supply} = \tan^{-1}\left(\frac{V_\beta}{V_\alpha}\right) \quad \text{(equation 8)}$$

In one embodiment, if $\theta_{supply}-\theta_{flux} \geq 0°$ and $\theta_{supply}-\theta_{flux} \leq 30°$, then torque is expected to be positive. For all other phase angle differences the torque is expected to be negative and the torque module 204 may determine that the motor torque is less than the negative torque threshold. In other embodiments, a different phase angle difference range may be used. For example, the phase range may be about $\theta_{supply}-\theta_{emf} \geq 0°$ and $\theta_{supply}-\theta_{emf} \leq 60°$, and all sub-ranges therebetween. Other ranges are possible. By stating that the range is "about" zero to 30 degrees or "about" zero to 60 degrees, one of skill in the art will recognize that a lower limit, for example, may be different than zero degrees by a small amount, for example −5° to 5°, and the upper limit may vary as well. In another embodiment, the phase range may differ based on various factors, such as motor type, motor size, motor load, motor speed, etc. In another embodiment, the phase range may be determined by experimentation. In another embodiment, the phase range may be determined by simulation. In another embodiment, the torque module 204 measures the phase of the back-EMF and compares the measured phase of the back-EMF to a measured phase of the voltage source 108. Estimating when torque is expected to be negative is discussed in more detail in U.S. application Ser. No. 14/321.356 titled Quasi Vector Motor Controller, filed Jul. 1, 2014, for Kun Wei, et al. which is incorporated herein by reference for all purposes.

In one embodiment, the phase range is set for when the motor 106 is expected to have negative torque and an upper limit and a lower limit of the phase range are set to when motor torque crosses from positive to negative or vice-versa. In another embodiment, the upper limit and/or lower limit of the phase range may be set for an expected negative torque at a particular value, such as a negative torque threshold. In another embodiment, the upper limit and/or lower limit of the phase range may be set for an expected positive torque before motor torque transitions negative. Typically phase angles where the upper and lower limits of the phase range are set affect current, motor starting time, etc.

The apparatus 200, in one embodiment, includes a next frequency module 206 that applies a second frequency to the motor 106 in response to the torque module 204 determining that the motor torque has reached the negative torque threshold. The second frequency includes a next frequency in the DFC method. For example, the DFC method may have a first frequency of 5 Hz and may have distinctive frequencies that increase by 2 Hz until reaching 25 Hz. (Note that for a 60 Hz system, an appropriate upper limit may be 30 Hz.) For instance, if the first frequency is 5 Hz, the second frequency may be 7 Hz, or where the first frequency is 7 Hz, the second frequency may be 9 Hz. Note that the example listed above is merely one set of discrete frequencies and other sets of discrete frequencies may be used by the DFC module 202 during motor starting.

For example, the DFC module 202 may apply a first frequency of 5 Hz to the motor 106 by generating current pulses as shown in FIG. 3. The motor 106 may then start rotating and eventually the torque module 204 may determine that motor torque generated by the motor 106 has reached the negative torque threshold. The next frequency module 206 may then apply a second frequency of 7 Hz to the motor 106. When the torque module 204 again determines that the motor torque generated by the motor 106 has reached the negative torque threshold, the next frequency module 206 may increase the frequency applied to the motor to 9 Hz. This process may continue until reaching a last frequency in the DFC method.

Figure 4:
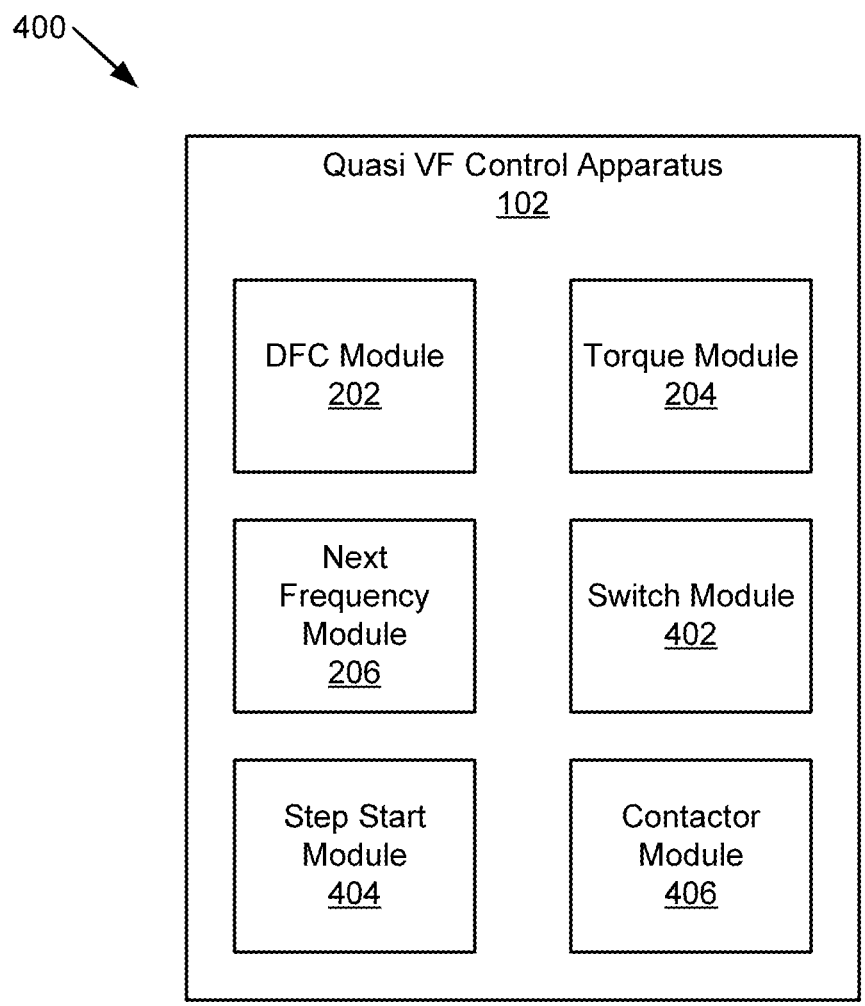
FIG. 4 is a schematic block diagram illustrating another embodiment of an apparatus for a quasi variable frequency motor controller.

FIG. 4 is a schematic block diagram illustrating another embodiment of an apparatus 400 for a quasi variable frequency motor controller. The apparatus 400 includes an embodiment of the quasi variable frequency control apparatus 102 with a DFC module 202, a torque module 204, and a next frequency module 206, which are substantially similar to those described above in relation to the apparatus 200 of FIG. 2. The apparatus 400 may also include, in various embodiments, a switch module 402, a step start module 404, and a contactor module 406, which are described below.

In one embodiment, the apparatus 400 includes a switch module 402 that selectively connects each input power conductor to the motor 106 in a sequence, where the DFC module 202 connects the power conductors to the motor 106 based on a discrete frequency of the plurality of discrete frequencies. In one embodiment, the switch module 402 includes switches, such as the thyristors Ta1, Ta2, Tb1 Tb2, Tc1, Tc2 of the system 100 of FIG. 1. In other embodiments, the switch module 402 may include other switches, such as metal-oxide field effect transistors ("MOSFETs"), insulated-gate bipolar transistors ("IGBTs"), etc. Typically the switching module 402 includes at least one switch per phase and may also include two switches per phase, as shown in FIG. 1. In another embodiment, the switch module 402 includes components that control the switches and may also include other typical components used for switching, such as snubbers, sensing circuits, opto-couplers, buffers, etc.

The DFC module 202, in one embodiment, interacts with the switch module to control switching to implement the DFC method during motor startup. In one embodiment, where the switch module 402 includes thyristors T, each thyristor T is controlled using the DFC method by adjusting a phase angle for turning on each thyristor T.

In one embodiment, the apparatus 400 includes a step start module 404 that executes one or more starting steps. Each starting step is initiated after the next frequency module 206 advances the discrete frequency to a last discrete frequency of the DFC method. The DFC method, in some embodiments, controls motor starting to an upper frequency that is below the fundamental frequency of the voltage source 108. For example, the DFC method may have a highest discrete frequency that is between about 25% and about 50% of the fundamental frequency of the voltage source 108 and all sub-ranges there-between. As the discrete frequencies increase, there are less zero crossings of the fundamental frequency of the voltage source 108 to generate current pulses 304. For instance, for a discrete frequency of 50% of the fundamental frequency of the voltage source 108, there are only two cycles of the voltage waveform of the voltage source 108 so there are not many opportunities to generate a current pulse 304 to create a discrete frequency with a fundamental frequency below the frequency of the voltage source 108.

In the situation of control of motor speeds corresponding to frequencies higher than around 25% and 50% of the fundamental frequency of the voltage source 108, one option is to include step start module 404 that controls starting of the motor 106 beyond control by the DFC method. In one embodiment, the step start module 404 includes setting, for a fixed period of time, a fixed on time of a switch of the switching module 402. For example, where the switches are thyristors T, the step start module 404 may set a thyristor firing angle to a fixed value. In one embodiment, the step start module 404 includes a single step. The single step may be a step for between a motor speed at the end of the DFC method and full motor speed. In another embodiment, the step start module 404 includes two or more steps where each step corresponds to a switch on time.

In another embodiment, the step start module 404 may ramp a switch's on time, for example, at a predetermined rate. Where the switches of the switch module 402 are thyristors T, the step start module 404 may increase a firing angle of the thyristors T toward a fully on condition. The ramp may be linear, may be linear with periods of a fixed on time of the switch, or may be nonlinear, such as an exponential rate of rise of on time of the switch. One of skill in the art will recognize other ramp types for the step start module 404.

In one embodiment, the apparatus includes a contactor module 406 that applies full input voltage of the voltage source 108 to the motor 106 after a last step of the step start module 404 and/or a last discrete frequency of the DFC module 202. The contactor module 406, in one embodiment, applies the full input voltage by closing a contactor in parallel with each thyristor T. For example, the contactor may include the contactor R shown in the system 100 of FIG. 1. Closing a contactor R in parallel with switches of the switching module 402 may be advantageous in some embodiments because the contactor R may have a lower resistance than the switches of the switching module 402, may require less control power, etc. and therefore may be more efficient.

In one embodiment, the apparatus 400 does not include the step start module 404 and the contactor module 406 closes the contacts R after the last discrete frequency of the DFC method. In another embodiment, the apparatus 400 includes the step start module 404 and the contactor module 406 closes the contacts R after a last step of the step start module 404.

Figure 5:
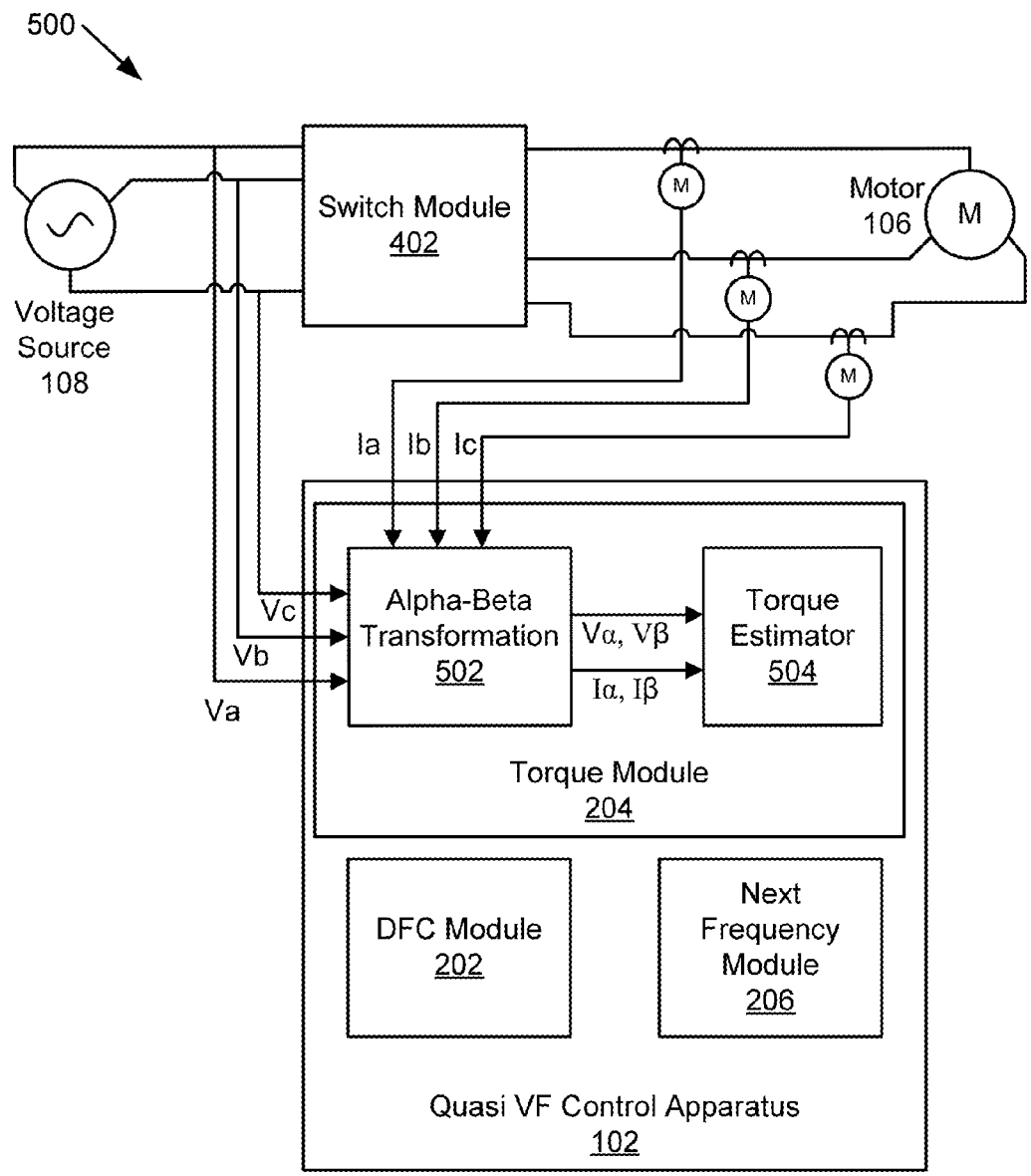
FIG. 5 is a schematic block diagram illustrating a third embodiment of an apparatus for a quasi variable frequency motor controller.

FIG. 5 is a schematic block diagram illustrating a third embodiment of an apparatus 500 for a quasi variable frequency motor controller. The apparatus 500 includes a DFC module 202, a torque module 204, and a next frequency module 206, which are substantially similar to those described above in relation to the apparatuses 200, 400 of FIGS. 2 and 4. In addition, the torque module 204 includes an alpha-beta transformation 502 and a torque estimator 504. The motor 106, switch module 402, and voltage source 108 are depicted in FIG. 5 as well.

In FIG. 5, measurements for phase voltages Va, Vb, and Vc are shown as well as measurements for phase currents to the motor Ia, Ib, and Ic. The phase voltages Va, Vb, Vc and phase currents Ia, Ib, Ic are shown feeding into the alpha-beta transformation 502. The alpha-beta transformation 502, in one embodiment, may be the same as in equations 2-6 described above. In one embodiment, the alpha-beta transformation 502 is implemented by digitizing the phase voltages Va, Vb, Vc and phase currents Ia, Ib, Ic and using a processor to implement equations 2-6. In another embodiment, discrete logic components are used to implement equations 2-6.

Figure 6:
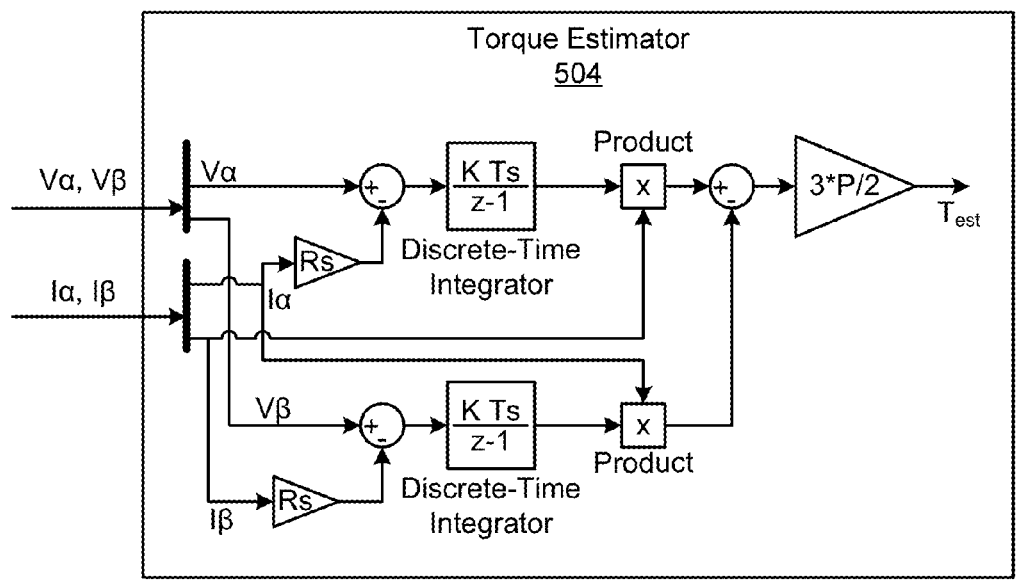
FIG. 6 is a schematic block diagram illustrating one embodiment of the torque estimator for a quasi variable frequency motor controller.
Figure 9A:
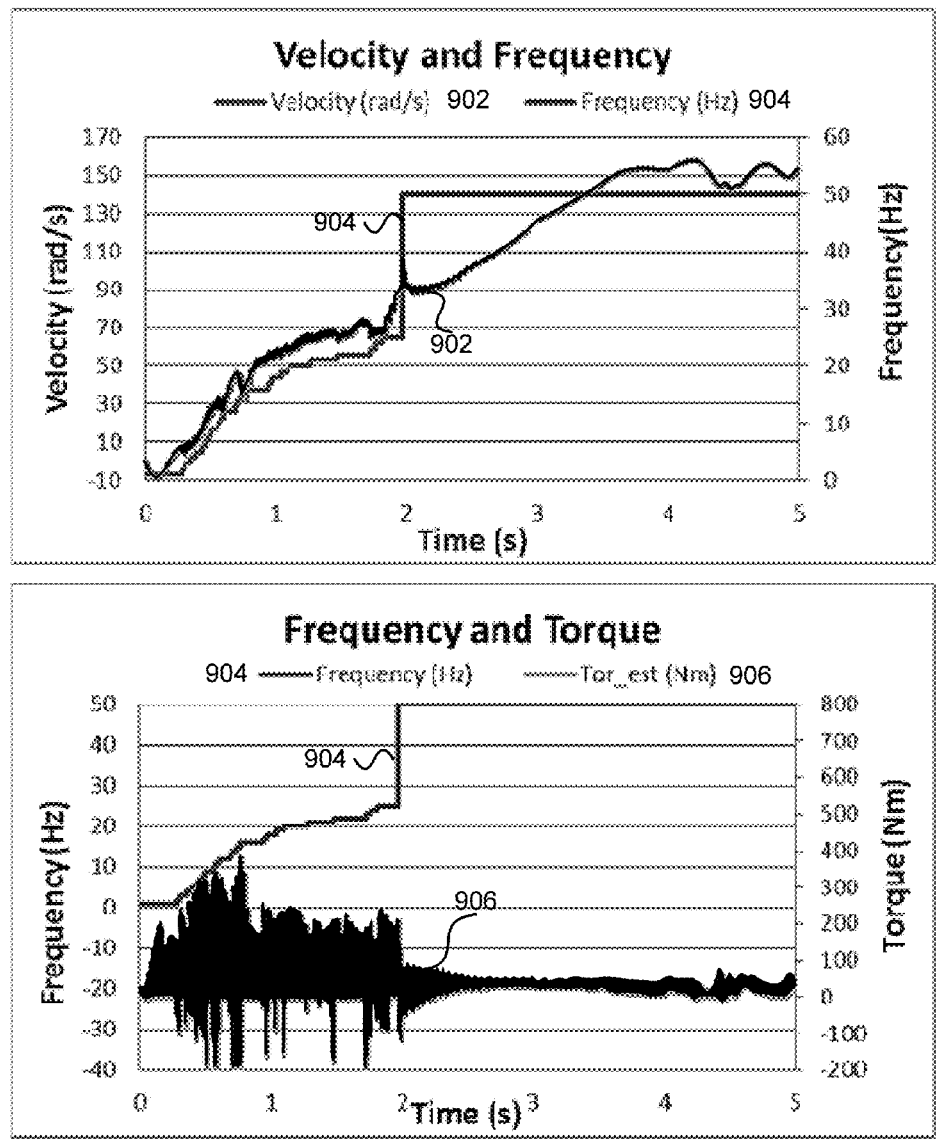
FIG. 9A are simulation results for a quasi variable frequency motor controller for a 10 horsepower ("HP") motor.
Figure 9B:
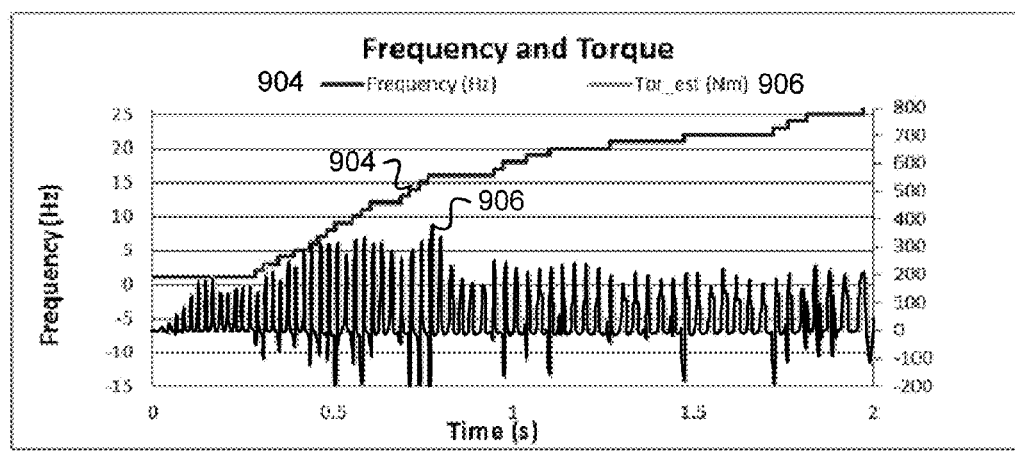
FIG. 9B is an enlarged view of the simulation results of FIG. 9A.

In one embodiment, the alpha-beta voltages and currents $V_\alpha$, $V_\beta$, $I_\alpha$, $I_\beta$ are fed to the torque estimator 504 to calculate motor torque $T_{est}$ using equation 1. FIG. 6 is a schematic block diagram illustrating one embodiment of the torque estimator 504 for a quasi variable frequency motor controller. In one embodiment, the torque estimator 504 in FIG. 6 implements equation 1. The torque estimator 504 may be implemented using software and a processor or may be implemented using discrete logic components. The DFC module 202 and next frequency module 206 operate as described above so that when the torque module 204 determines that motor torque has reached the negative torque threshold, the next frequency module 206 implements a next discrete frequency. In one embodiment, the apparatus 500 of FIG. 5 and torque estimator 504 of FIG. 6 are used to create a model for simulation. Simulation results from the model are shown in FIGS. 9A and 9B.

Figure 7:
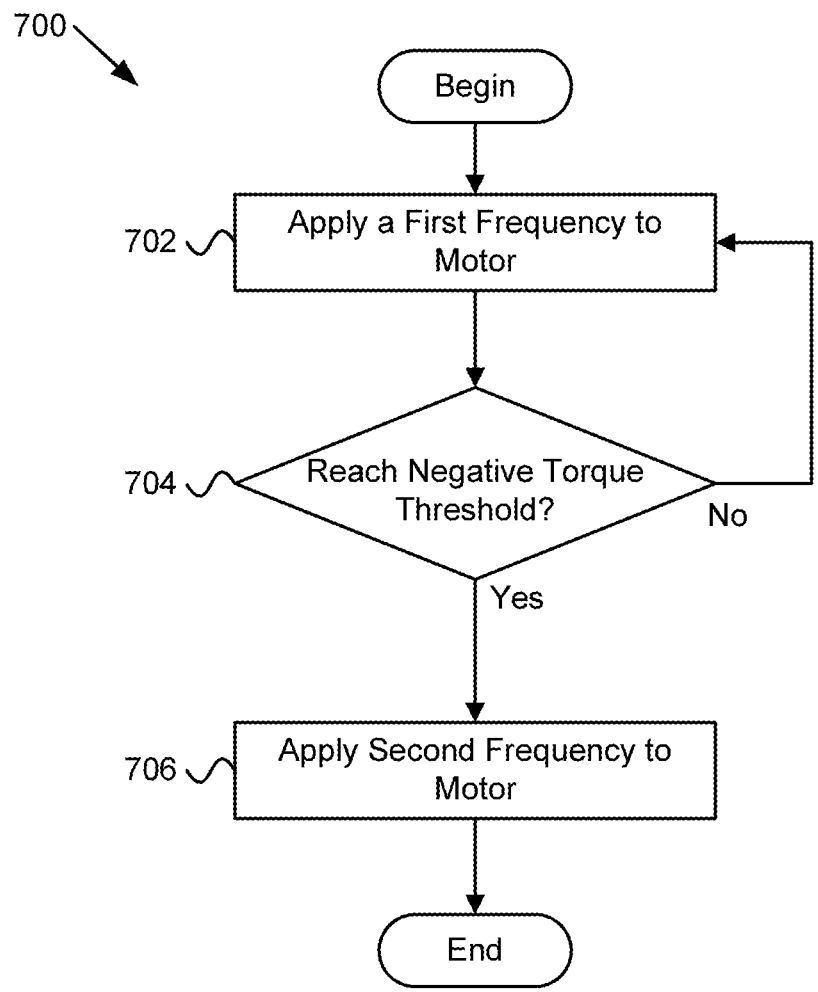
FIG. 7 is a schematic flow chart diagram illustrating one embodiment of a method for a quasi variable frequency motor controller.

FIG. 7 is a schematic flow chart diagram illustrating one embodiment of a method 700 for a quasi variable frequency motor controller. The method 700 begins and applies 702 a first frequency to the motor 106 as part of a DFC method for motor starting. The first frequency is a discrete frequency in a plurality of discrete frequencies of the DFC method and each discrete frequency includes a frequency lower than a fundamental frequency of the voltage source 108 providing power to the motor 106. In one embodiment, the DFC module 202 applies 702 the first frequency to the motor 106.

The method 700 determines 704 if motor torque has reached a negative torque threshold. If the method 700 determines 704 that motor torque has not reached the negative torque threshold, the method 700 continues to apply 702 the first discrete frequency to the motor 106. If the method 700 determines 704 that motor torque has reached the negative torque threshold, the method 700 applies a second discrete frequency to the motor 106, and the method 700 ends. In one embodiment, the torque module 204 determines 704 if the motor torque has reached the negative torque threshold and the next frequency module 206 applies 706 the second discrete frequency to the motor 106.

Figure 8:
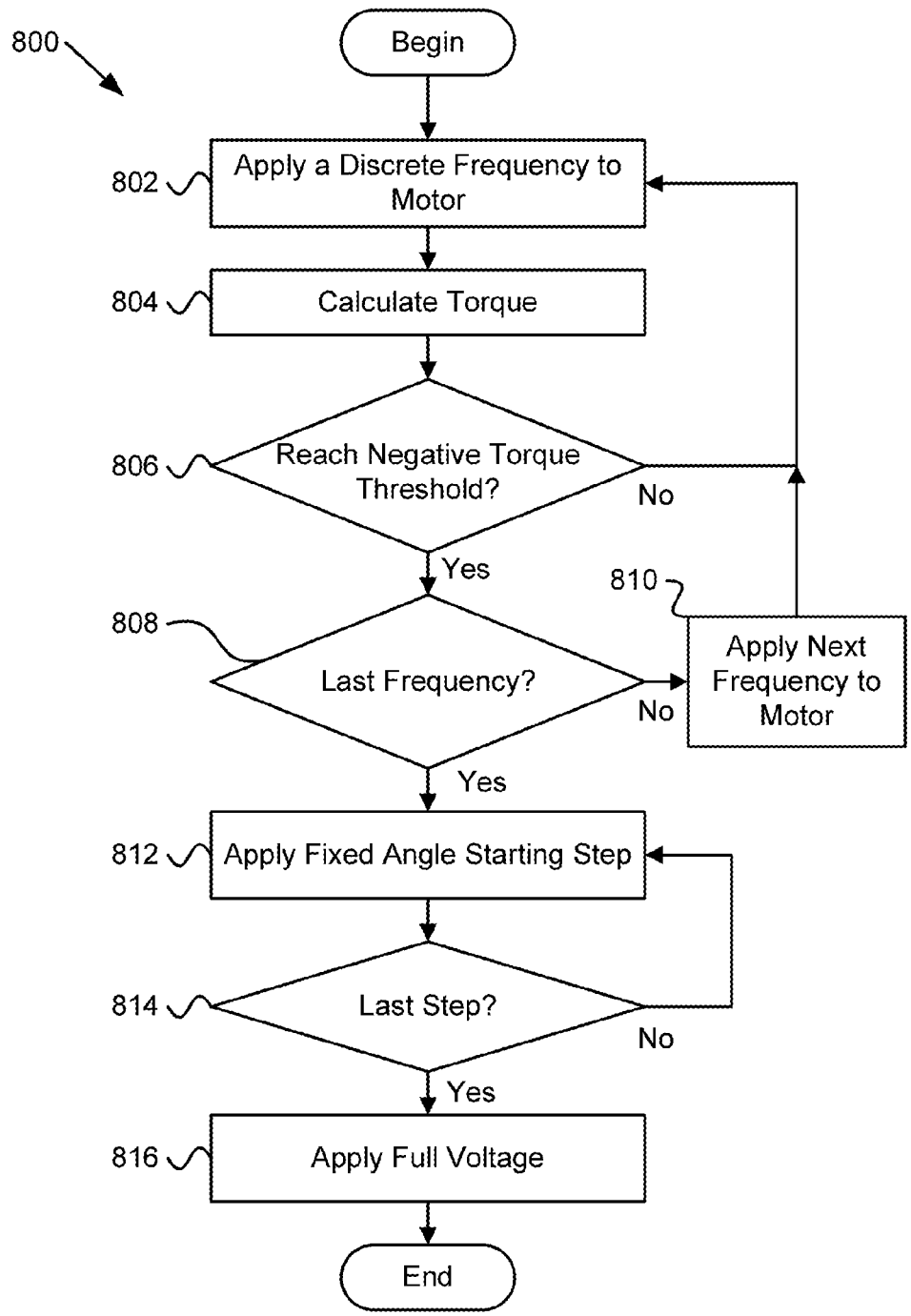
FIG. 8 is a schematic flow chart diagram illustrating another embodiment of a method for a quasi variable frequency motor controller.

FIG. 8 is a schematic flow chart diagram illustrating another embodiment of a method 800 for a quasi variable frequency motor controller. The method 800 begins and applies 802 a discrete frequency to the motor 106 as part of a DFC method for motor starting. The discrete frequency is a discrete frequency in a plurality of discrete frequencies of the DFC method and each discrete frequency includes a frequency lower than a fundamental frequency of the voltage source 108 providing power to the motor 106.

The method 800 calculates 804 motor torque, for example using equation 1. In one embodiment, the torque module 204 calculates motor torque. The method 800 determines 806 if motor torque has reached a negative torque threshold. If the method 800 determines 806 that motor torque has not reached the negative torque threshold, the method 800 continues to apply 802 the first discrete frequency to the motor 106. If the method 800 determines 806 that motor torque has reached the negative torque threshold, the method 800 determines 808 if the DFC method has reached a last discrete frequency. If the method 800 determines 808 that the DFC method has not reached a last discrete frequency, the method 800 applies 810 a next discrete frequency to the motor 106 and continues to apply 802 the discrete frequency to the motor 106.

If the method 800 determines 808 that the last discrete frequency has been reached, the method 800 applies 812 a fixed angle starting step to the motor 106. For example, the step start module 404 may apply 812 the fixed angle starting step to the motor 106. The method 800 determines 814 if the last starting step is reached. If the method 800 determines that the last starting step has not been reached, the method 800 returns and applies 812 a next fixed angle starting step to the motor 106. The step start module 404 may determine 814 if a last starting step has been reached. If the method 800 determines 814 that the last starting step has been reached, the method 800 applies 816 full voltage to the motor 106, and the method 800 ends. In one embodiment, the contactor module 406 applies the full voltage to the motor 106.

FIG. 9A are simulation results for a quasi variable frequency motor controller for a 10 horsepower ("HP") motor and FIG. 9B is an enlarged view of the simulation results of FIG. 9A. For example, the simulation results of FIGS. 9A and 9B may use a simulation model similar to the apparatus 500 depicted in FIGS. 5 and 6. The upper graph on FIG. 9A depicts velocity and frequency for a startup of a 10 HP, three-phase AC squirrel cage motor with a 50% constant load. The simulation uses the DFC method and transitions to a new frequency when the motor torque is below a negative torque threshold of −30 newton-meters ("Nm"). The DFC method increases by 1 Hz for each step from 1 Hz to 25 Hz. The supply voltage has a fundamental frequency of 50 Hz. At 25 Hz, the simulation steps from 25 Hz to 50 Hz in one step.

Velocity, in radians per second, and frequency, in hertz, are shown on the vertical axes and time, in seconds, is shown on the horizontal axis. The frequency plot 904 indicates how the frequency DFC method and last 25 Hz step progresses. The velocity plot 902 depicts how the motor speed increases from zero to around 150 radians per second over 5 seconds. The lower graph shows frequency and torque for the same simulation as the upper graph. Frequency, in hertz, and torque, in newton-meters, are shown on the vertical axes and time is again shown on the horizontal axis. The torque plot 906 from 1 Hz to 25 Hz shows how torque varies over time and surges negative. At the 25 to 50 Hz transition, the torque 906 settles down since full voltage at 50 Hz is applied to the motor.

FIG. 9B is an enlarged view of the lower chart on FIG. 9A and depicts the first 2 seconds while frequency is controlled using the DFC method along with increasing frequency when the negative torque threshold is exceeded, as described herein. The plot of torque 906 indicates how torque oscillates and then transitions negative. Without the control technique describe herein, simulation results have shown that if the frequency, for example, is kept at a certain discrete frequency for a fixed time period, the motor torque would transition negative more often than in the simulation depicted in FIGS. 9A and 9B.

Figure 10:
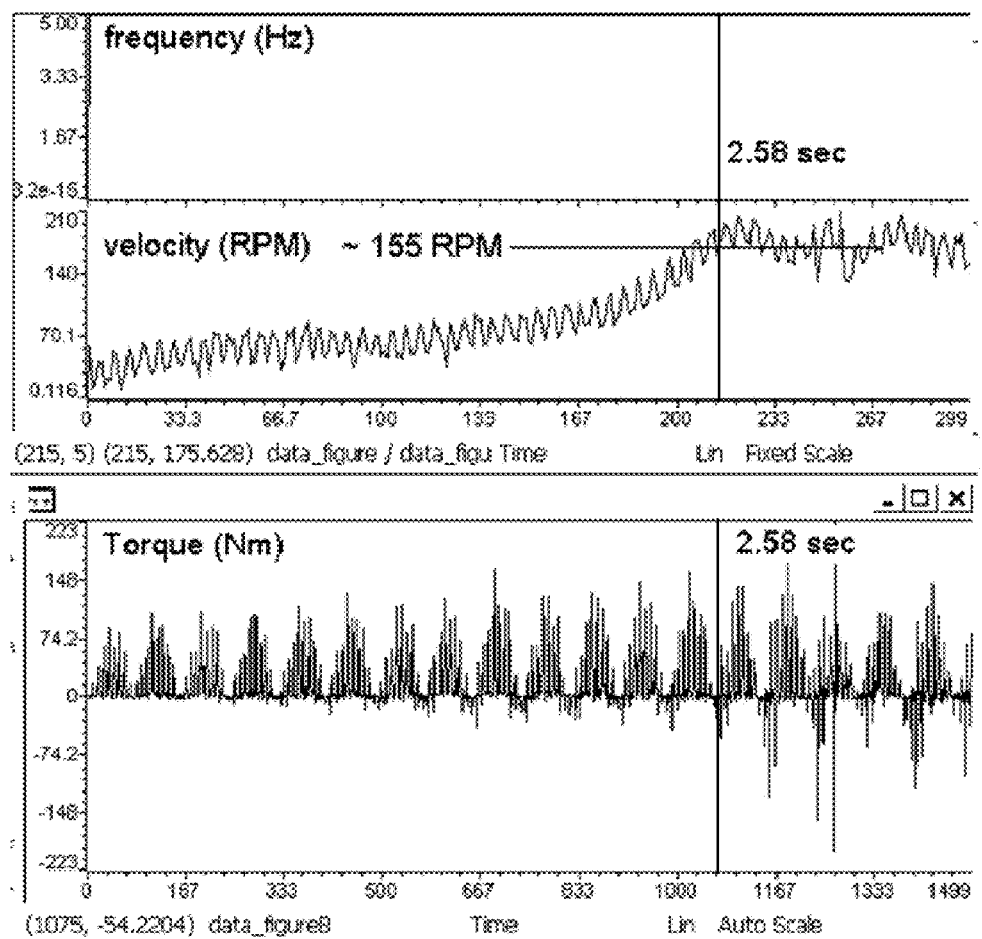
FIG. 10 depicts waveforms from test results of one embodiment of a quasi variable frequency motor controller for a 10 HP motor where a starting frequency is fixed at 5 hertz ("Hz")

FIG. 10 depicts waveforms from test results of one embodiment of a quasi variable frequency motor controller for a 10 HP motor where a starting frequency is fixed at 5 Hz. The test results are for a load of 5% of rated load. The sampling period is 12 milliseconds ("mS") for the upper graph. Motor speed is sampled from an encoder. The upper graph includes frequency in hertz on the vertical axis and time on the horizontal axis. A vertical marker indicates where time reaches 2.58 seconds. The lower graph is for the same test and shows torque in newton-meters on the vertical axis and time on the horizontal axis. The sampling period is 2.4 mS for the lower graph. Again a vertical marker is shown at 2.58 seconds. For the test, frequency is fixed at 5 Hz using the DFC method where current pulses are varied to generate a 5 Hz fundamental frequency in the stator windings. As can be seen, when the motor velocity reaches about 155 revolutions per minute ("RPM"), the motor torque starts to transition to negative values of a higher amplitude.

Figure 11:
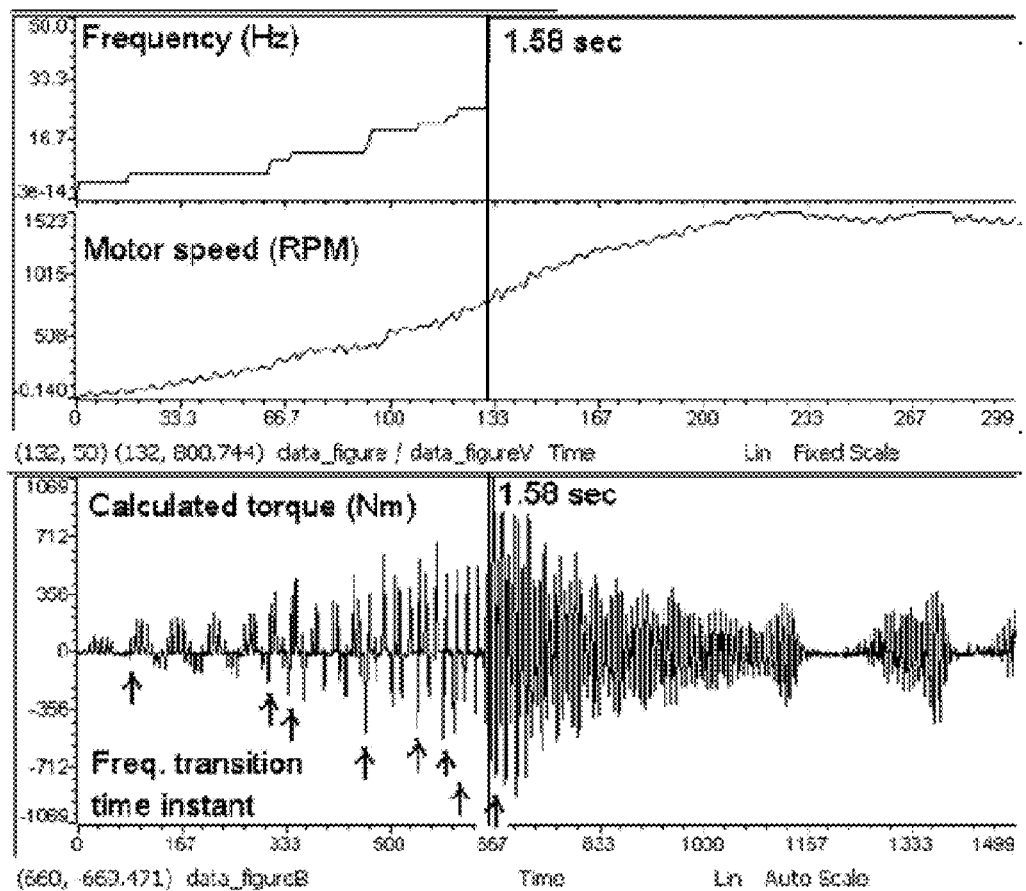
FIG. 11 depicts waveforms from test results of one embodiment of a quasi variable frequency motor controller for a 10 HP motor with an initial frequency of 5 Hz, 2 Hz steps, and at no load.

FIG. 11 depicts waveforms from test results of one embodiment of a quasi variable frequency motor controller for a 10 HP motor with an initial frequency of 5 Hz, 2 Hz steps, and at no load. The top part of the upper graph shows frequency in hertz on the vertical axis and the bottom part of the upper graph shows motor speed in RPM on the vertical axis and time on the horizontal axis. The lower graph shows motor torque in newton-meters on the vertical axis and time on the horizontal axis. Arrows on the lower graph and the left under the torque plot show frequency transition times where the last transition is from about 25 Hz to 50 Hz. Note that while motor torque does transition negative, transitioning to a next frequency reduces the amount of negative torque transitions. This is evident after the frequency transitions to a fixed 50 Hz where motor torque transitions negative at a higher rate than from 5 Hz to 25 Hz.

Figure 12:
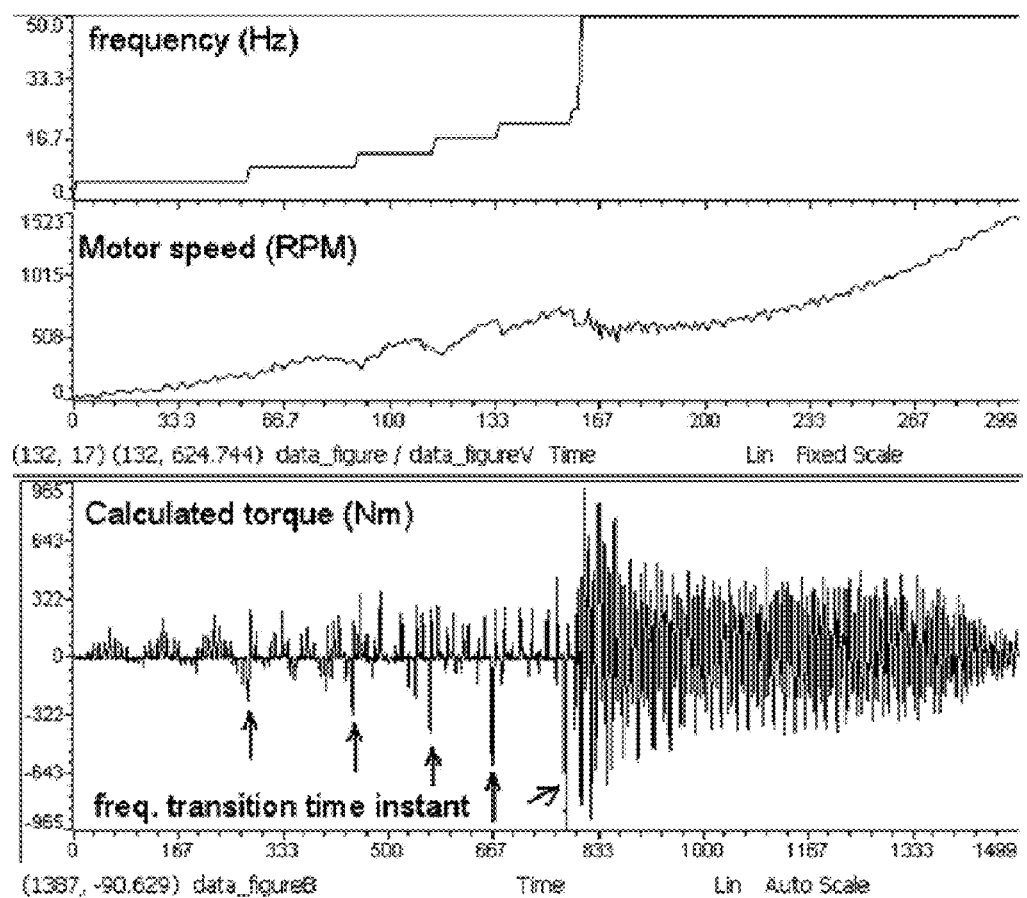
FIG. 12 depicts waveforms from test results of one embodiment of a quasi variable frequency motor controller for a 10 HP motor with an initial frequency of 5 Hz, 4 Hz steps, and at no load.

FIG. 12 depicts waveforms from test results of one embodiment of a quasi variable frequency motor controller for a 10 HP motor with an initial frequency of 5 Hz, 4 Hz steps, and at no load. The top part of the upper graph shows frequency in hertz on the vertical axis and the bottom part of the upper graph shows motor speed in RPM on the vertical axis and time on the horizontal axis. The lower graph shows motor torque in newton-meters on the vertical axis and time on the horizontal axis. Arrows on the lower graph and the left under the torque plot again show frequency transition times where the last transition is again from about 25 Hz to 50 Hz. Again, while the frequency is controlled from 5 Hz to 25 Hz using the DFC method and transitioning to a next discrete frequency when the motor torque reaches a negative torque threshold, motor torque transitions negative less than when the frequency is fixed at 50 Hz. Reducing negative motor torque transitions to a negative value reduces motor current, mechanical stress, noise, etc.

Figure 13:
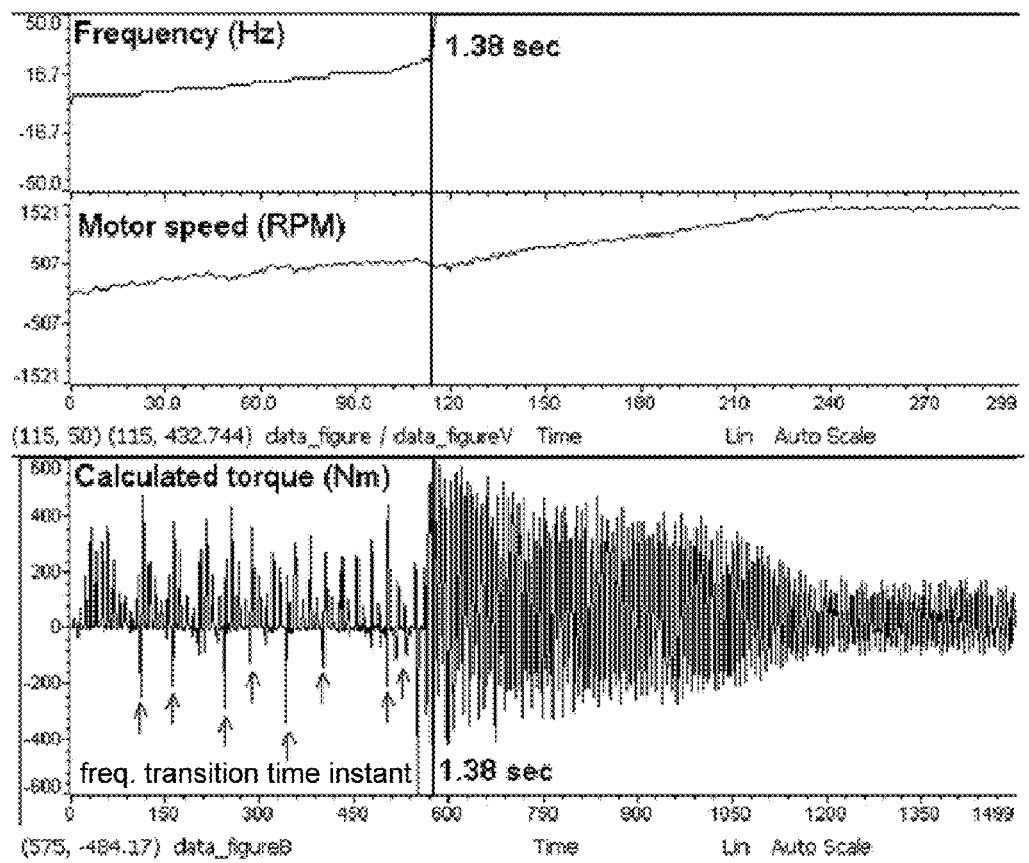
FIG. 13 depicts waveforms from test results of one embodiment of a quasi variable frequency motor controller for a 10 HP motor with an initial frequency of 5 Hz, 2 Hz steps, and at 50% load.

FIG. 13 depicts waveforms from test results of one embodiment of a quasi variable frequency motor controller for a 10 HP motor with an initial frequency of 5 Hz, 2 Hz steps, and at 50% load. The top part of the upper graph again shows frequency in hertz on the vertical axis and the bottom part of the upper graph again shows motor speed in RPM on the vertical axis and time on the horizontal axis. The lower graph shows motor torque in newton-meters on the vertical axis and time on the horizontal axis. A vertical marker is positioned at 1.38 seconds, which is about when frequency transitions from about 25 Hz to 50 Hz. Arrows on the lower graph and the left under the torque plot again show frequency transition times where the last transition is again from about 25 Hz to 50 Hz. Once again motor torque transitions negative much less while controlled by the quasi variable frequency motor controller than when frequency is fixed at 50 Hz.

The described examples and embodiments are to be considered in all respects only as illustrative and not restrictive. This written description uses examples and embodiments to disclose the invention, including best mode, and also to enable any person skilled in the art to practice the invention, including making and using any devices or systems and performing any incorporated methods. The examples and embodiments may be practiced in other specific forms. The patentable scope of this invention is defined by the claims and may include other examples that occur to those skilled in the art. Such other examples are intended to be within the claims if they have structural elements that do not differ from the literal language of the claims, or if they include equivalent structural element with insubstantial differences from the literal languages of the claims.

What is claimed is:

1. An apparatus comprising:
    a DFC module that applies a first frequency to a motor as part of a discrete frequency control ("DFC") method for motor starting, the first frequency comprising a discrete frequency in a plurality of discrete frequencies of the DFC method and wherein each discrete frequency comprises a frequency lower than a fundamental frequency of an alternating current ("AC") voltage source providing power to the motor;
    a torque module that determines, from data received from motor sensors, when motor torque generated by the motor reaches a negative torque threshold; and
    a next frequency module that applies a second frequency to the motor in response to the torque module determining that the motor torque has reached the negative torque threshold, the second frequency comprising a next frequency in the DFC method,
    wherein at least a portion of the DFC module, the torque module, and the next frequency module comprise one or more of hardware and executable code, the executable code stored on one or more non-transitory computer readable storage media.

2. The apparatus of claim 1, further comprising a switch module that selectively connects each input power conductor to the motor in a sequence, wherein the DFC module connects the power conductors to the motor based on a discrete frequency of the plurality of discrete frequencies.

3. The apparatus of claim 2, wherein the switch module comprises one or more thyristors and wherein each thyristor is controlled using the DFC method by adjusting a phase angle for turning on each thyristor.

4. The apparatus of claim 2, further comprising a step start module that executes one or more starting steps, each starting step initiated after the next frequency module advances the discrete frequency to a last discrete frequency of the DFC method, each step comprising one or more of:
    setting, for a fixed period of time, an on time of a switch of the switching module to a fixed value; and
    ramping an on time of a switch of the switching module.

5. The apparatus of claim 4, further comprising a contactor module that applies full input voltage to the motor after one or more of a last step of the step start module and a last discrete frequency of the DFC module, the contactor module applying the full input voltage by closing a contactor in parallel with each thyristor.

6. The apparatus of claim 1, wherein the DFC module applies a discrete frequency by varying a phase angle for turning on a thyristor to generate positive current pulses of varying amplitudes for a positive half cycle of the discrete frequency and then varying a phase angle for turning on a thyristor to generate negative current pulses of varying amplitudes for a negative half cycle of the discrete frequency, wherein each current pulse is generated at a rate consistent with the fundamental frequency of the AC voltage source.

7. The apparatus of claim 1, wherein the torque module determines motor torque by calculating motor torque from input voltage and current information, the input voltage and current information from conductors connected to the motor to provide power to the motor.

8. The apparatus of claim 7, wherein the torque module determines motor torque using the following equation:

$$T_{est} = \frac{3}{2} P \left[ I_\beta \cdot \int (V_\alpha - I_\alpha R_s) dt - I_\alpha \cdot \int (V_\beta - I_\beta R_s) dt \right]$$

wherein:
    $T_{est}$ is calculated motor torque;
    P is the number of motor poles;
    $R_s$ is resistance of stator winding;
    $V_\alpha$, $V_\beta$ are stator voltage in a stationary reference frame; and
    $I_\alpha$, $I_\beta$ are stator current in the stationary reference frame,
    wherein the voltage and current for each phase of the motor are transformed to the stationary reference frame using an alpha-beta transformation.

9. The apparatus of claim 1, wherein the torque module determines motor torque by measuring motor torque.

10. The apparatus of claim 1, wherein the torque module determines motor torque based on a phase of input power in relation to a phase of rotor current.

11. The apparatus of claim 1, wherein the next frequency module applies a next frequency of the DFC method each time the torque module determines that the motor torque reaches the negative torque threshold until reaching a final frequency of the DFC method.

12. The apparatus of claim 1, wherein a last discrete frequency in the DFC method comprises a frequency that is between 25 percent and 50 percent of the fundamental frequency of the AC voltage source.

13. The apparatus of claim 1, wherein the motor comprises one of a three-phase AC squirrel cage motor and a three-phase AC synchronous motor.

14. A method comprising:
applying a first frequency to a motor as part of a discrete frequency control ("DFC") method for motor starting, the first frequency comprising a discrete frequency in a plurality of discrete frequencies of the DFC method and wherein each discrete frequency comprises a frequency lower than a fundamental frequency of an alternating current ("AC") voltage source providing power to the motor;
determining, from data received from motor sensors, when motor torque generated by the motor reaches a negative torque threshold; and
applying a second frequency to the motor in response to determining that the motor torque reaches the negative torque threshold, the second frequency comprising a next frequency in the DFC method.

15. The method of claim 14, wherein determining motor torque comprises calculating motor torque from input voltage and current information, the input voltage and current information from conductors connected to the motor to provide power to the motor.

16. The method of claim 15, wherein determining motor torque comprises using the following equation:

$$T_{est} = \frac{3}{2}P\left[I_\beta \cdot \int (V_\alpha - I_\alpha R_s)dt - I_\alpha \cdot \int (V_\beta - I_\beta R_s)dt\right]$$

wherein:
$T_{est}$ is calculated motor torque;
P is the number of motor poles;
$R_s$ is resistance of stator winding;
$V_\alpha$, $V_\beta$ are stator voltage in a stationary reference frame; and
$I_\alpha$, $I_\beta$ are stator current in the stationary reference frame,
wherein the voltage and current for each phase of the motor are transformed to the stationary reference frame using an alpha-beta transformation.

17. The method of claim 14, further comprising applying a next frequency of the DFC method each time that the motor torque reaches the negative torque threshold until reaching a final frequency of the DFC method.

18. The method of claim 14, further comprising selectively connecting each input power conductor to the motor in a sequence, wherein the DFC method comprises connecting the power conductors to the motor based on a discrete frequency of the plurality of discrete frequencies.

19. The method of claim 18, wherein selectively connecting each input power conductor to the motor in a sequence comprises switching one or more thyristors and wherein each thyristor is controlled using the DFC method by adjusting a phase angle for turning on each thyristor.

20. The method of claim 14, further comprising:
executing one or more starting steps, each starting step initiated after advancing the discrete frequency to a last discrete frequency of the DFC method, each step comprising one or more of:
setting, for a fixed period of time, an on time of a switch to a fixed value, the switch connecting the AC voltage source to the motor; and
ramping an on time of a switch connecting the AC voltage source to the motor; and
applying full input voltage to the motor after a last starting step, wherein applying the full input voltage comprises closing a contactor in parallel with each thyristor.

21. The method of claim 14, wherein applying a discrete frequency comprises varying a phase angle for turning on a thyristor to generate positive current pulses of varying amplitudes for a positive half cycle of the discrete frequency and then varying a phase angle for turning on a thyristor to generate negative current pulses of varying amplitudes for a negative half cycle of the discrete frequency, wherein each current pulse is generated at a rate consistent with the fundamental frequency of the AC voltage source.

22. A system comprising:
a motor starter comprising one or more thyristors connected between each phase of an input power source and a corresponding motor connector;
a DFC module that applies a first frequency to the motor as part of a discrete frequency control ("DFC") method for motor starting, the first frequency comprising a discrete frequency in a plurality of discrete frequencies of the DFC method and wherein each discrete frequency comprises a frequency lower than a fundamental frequency of an alternating current ("AC") voltage source providing power to the motor;
a switch module that selectively turns on, based on a selected discrete frequency of the DFC module, each thyristor to connect each phase of the input power source to the corresponding motor connector in a sequence;
a torque module that determines, from data received from motor sensors, when motor torque generated by the motor reaches a negative torque threshold; and
a next frequency module that applies a second frequency to the motor in response to the torque module determining that the motor torque reaches the negative torque threshold, the second frequency comprising a next frequency in the DFC method.

* * * * *